United States Patent
Huh et al.

(10) Patent No.: US 9,062,842 B2
(45) Date of Patent: Jun. 23, 2015

(54) LIGHTING DEVICE FOR STREET LAMP

(75) Inventors: Jae-Suk Huh, Yongin-si (KR); Bo-A Kim, Hwaseong-si (KR)

(73) Assignee: Unitest Inc., Yongin-si (KR)

( * ) Notice: Subject to any disclaimer, the term of this patent is extended or adjusted under 35 U.S.C. 154(b) by 40 days.

(21) Appl. No.: 14/122,494

(22) PCT Filed: May 23, 2012

(86) PCT No.: PCT/KR2012/004050
§ 371 (c)(1),
(2), (4) Date: Nov. 26, 2013

(87) PCT Pub. No.: WO2012/165798
PCT Pub. Date: Dec. 6, 2012

(65) Prior Publication Data
US 2014/0111989 A1   Apr. 24, 2014

(30) Foreign Application Priority Data

May 27, 2011  (KR) .................. 10-2011-0050900

(51) Int. Cl.
*F21S 8/08* (2006.01)
*F21V 7/00* (2006.01)
(Continued)

(52) U.S. Cl.
CPC .................. *F21S 8/085* (2013.01); *Y02B 20/72* (2013.01); *F21V 7/0033* (2013.01); *F21V 7/005* (2013.01);
(Continued)

(58) Field of Classification Search
CPC ........ F21S 8/08; F21S 8/085; F21Y 2101/02; Y02B 20/72; F21W 2131/103; F21V 7/00; F21V 7/0033; F21V 7/09; F21V 7/05; F21V 7/04; F21V 7/0025; F21V 7/0083; F21V 29/002; F21V 29/20; F21V 29/777; F21V 29/76; F21V 29/763
See application file for complete search history.

(56) References Cited

U.S. PATENT DOCUMENTS 6,183,100 B1 *  2/2001  Suckow et al. ................. 362/35
8,083,371 B2 * 12/2011  Lin et al. ....................... 362/241
(Continued)

FOREIGN PATENT DOCUMENTS

DE    10044455 A1    9/2000
JP    2004-185912 A  7/2004
(Continued)

OTHER PUBLICATIONS

German Office Action issued on Sep. 29, 2014 in counterpart German Application No. 112012002262.9 (13 pages with English translation).

(Continued)

*Primary Examiner* — Bao Q Truong
(74) *Attorney, Agent, or Firm* — NSIP Law

(57) ABSTRACT

Disclosed is a lighting device for a street lamp, of which a structure is improved such that the diffusion degree of light may be effectively controlled by improving the directivity of a luminous element. To this end, the lighting device for a street lamp includes: a base member which is formed at an upper side of a street lamp body arranged above a ground surface; a plurality of luminous element units, which are comprised of at least one luminous element, and are arranged on the bottom surface of the base member; and a plurality of reflection units, which are arranged to be adjacent to the luminous element units, and are arranged mutually isolated from each other by a predetermined distance on the bottom surface of the base member to diffuse light radiated from the luminous element units in multiple directions.

5 Claims, 7 Drawing Sheets

(51) Int. Cl.
- *F21V 7/05* (2006.01)
- *F21V 7/09* (2006.01)
- *F21W 131/103* (2006.01)
- *F21Y 101/02* (2006.01)
- *F21V 29/76* (2015.01)
- *F21V 29/77* (2015.01)

(52) U.S. Cl.
CPC .... *F21V 7/05* (2013.01); *F21V 7/09* (2013.01); *F21W 2131/103* (2013.01); *F21Y 2101/02* (2013.01); F21V 7/00 (2013.01); *F21V 29/76* (2015.01); *F21V 29/763* (2015.01); *F21V 29/777* (2015.01)

(56) References Cited

U.S. PATENT DOCUMENTS

| | | |
|---|---|---|
| 8,534,865 B2 | 9/2013 | Kim et al. |
| 8,651,695 B2 * | 2/2014 | Fields et al. ............ 362/246 |
| 2007/0247856 A1 | 10/2007 | Wang et al. |
| 2009/0021931 A1 * | 1/2009 | Mayer et al. ............ 362/235 |
| 2009/0103288 A1 | 4/2009 | Boyer et al. |
| 2009/0219715 A1 | 9/2009 | Peck et al. |
| 2009/0225543 A1 | 9/2009 | Jacobson et al. |
| 2012/0002413 A1 * | 1/2012 | Kim et al. ............ 362/235 |
| 2012/0026728 A1 * | 2/2012 | Lou et al. ............ 362/217.05 |

FOREIGN PATENT DOCUMENTS

| | | |
|---|---|---|
| JP | 2009-026660 A | 2/2009 |
| JP | 2010-153401 A | 7/2010 |
| JP | 2011-146374 A | 7/2011 |
| KR | 10-2009-0029056 A | 3/2009 |
| KR | 10-2010-0020786 A | 2/2010 |
| KR | 10-0972840 B1 | 7/2010 |
| KR | 10-1001600 B1 | 12/2010 |

OTHER PUBLICATIONS

International Search Report issued Nov. 29, 2012 in counterpart International Application No. PCT/KR2012/004050 (5 pages, in Korean, with complete English translation).

* cited by examiner

LIGHTING DEVICE FOR STREET LAMP

CROSS-REFERENCE TO RELATED APPLICATIONS

This application is a National Stage of International Application No. PCT/KR2012/004050, filed May 23, 2012 and published as WO2012/165798 A3 on Dec. 6, 2012, which claims the benefit of Korean Patent Application No. 10-2011-0050900, filed on May 27, 2011, the entire disclosures of which are incorporated herein by reference for all purposes.

TECHNICAL FIELD

The present invention relates to a lighting device for a street lamp, and more particularly, to a lighting device for a street lamp, which is formed on the periphery of a roadway to maintain uniform and stable roadway illumination.

BACKGROUND ART

A lighting device refers to a lamp that uses electricity. Depending on light emission methods, the lighting device may be divided into an incandescent electric lamp for illumination, which uses emissions of heat and light of a tungsten filament, an arc lamp for outdoor lighting, which uses incandescent light generated by arc discharge between electrodes, a fluorescent lamp, which emits light by radiating electrons to a phosphor by discharge, and the like.

Depending on purposes of use, the lighting device may be divided into a street light, a security light/guard light, a park light and the like. As for a light source for the lighting device, a sodium lamp or a mercury lamp is generally used. As the sodium lamp radiates light by using light generated by discharge of sodium vapor, its color is yellow. However, a drawback of the sodium lamp is that it takes about 20 to 30 minutes after lighting the sodium lamp for light to be sufficiently emitted, and also, its yellow color makes the sodium lamp inappropriate for use in general illumination, thereby limiting its use.

Meanwhile, the mercury lamp having high luminous efficiency normally radiates light several minutes after lighting when vapor pressure of mercury, which is initially low, is increased. However, the mercury lamp has a problem in that as temperature of the mercury lamp is decreased once light is turned off, lighting again is not possible for about 10 minutes until gas pressure is decreased.

Further, the above-mentioned lighting sources, which have fairly high power consumption, have a problem of consuming a lot of fuel in inboard power plants. For this reason, there have been efforts to apply a light emitting diode (LED) device, which has high luminous efficiency and low power consumption, to a lighting device.

However, the LED has limitations for being used for a street light, a security light, a park light and the like, due to narrowness of light radiated from the LED. In other words, a street light requires evenness to maintain uniform illumination in the street, but the narrowness of the LED provides illumination only to the areas in the vicinity thereof.

For example, the street lamp is arranged on the ground at a pre-designated interval according to its height. When a conventional sodium lamp or a mercury lamp is used as a light source, spaces between the street lamps can be sufficiently illuminated as diffusion of light is easy. However, as the LED is much narrower than the sodium lamp or the mercury lamp, spaces between the street lamps cannot be sufficiently illuminated.

In order to overcome the above problem, a conventional lighting device for a street lamp, which uses the LED as a light source, generally includes a diffusion lens, which is individually attached to a front surface of the LED, to realize targeted light distribution. However, this structure inevitably increases production resources and product costs as many lenses need to be assembled to manufacture the diffusion lens. Further, there are also problems of an increase in size and weight of products as well as optical loss of the lens itself.

DISCLOSURE

Technical Problem

An object of the present invention is to provide a lighting device for a street lamp, of which a structure is improved such that a degree of light diffusion is effectively controlled by improving directivity of a luminous element, using a method other than a method of light distribution control by a diffusion lens applied to a conventional lighting device for a street lamp.

Technical Solution

The present invention provides a lighting device for a street lamp, which includes: a base member that is formed at an upper side of a street lamp body arranged above a ground surface; a plurality of luminous element units, which are comprised of at least one luminous element, and are arranged on the bottom surface of the base member; and a plurality of reflection units, which are arranged to be adjacent to the luminous element units, and are arranged mutually isolated from each other by a predetermined distance on the bottom surface of the base member to diffuse light radiated from the luminous element units in multiple directions, in which the reflection unit includes: a first reflection section, which is arranged to be isolated from any one luminous element unit among the luminous element units by a predetermined distance, and formed to surround only one part of the luminous element unit such that at least one part of light radiated from the luminous element unit is reflected by the reflection units that are adjacently positioned in a first direction; and a second reflection section, which is formed to be slanted at a certain angle from the base member to diffuse light in multiple directions by being reflected by the reflection units, which are adjacently positioned in a second direction, opposite the first direction.

Effect of the Invention

As described above, in a lighting device for a street lamp according to the present invention, light distribution is controlled by using a reflection unit that reflects light in multiple directions, which is different from a conventional lighting device for a street lamp, which diffuses light using a diffusion lens. As a result, size, weight and production costs can be reduced, and uniform illumination in the street of a lane direction can be sufficiently secured, compared to a conventional lighting device for a street lamp.

Therefore, in a lighting device for a street lamp according to the present invention, a luminous element, which has better power efficiency than a mercury lamp or a sodium lamp, is used as a light source for a lighting device of a street lamp, such that power consumption and maintenance costs can be reduced, and besides, uniform illumination in the street can be improved to prevent glare affecting drivers, thereby satisfying driving convenience as well as preventing traffic accidents.

BEST MODE OF THE INVENTION

Figure 1:
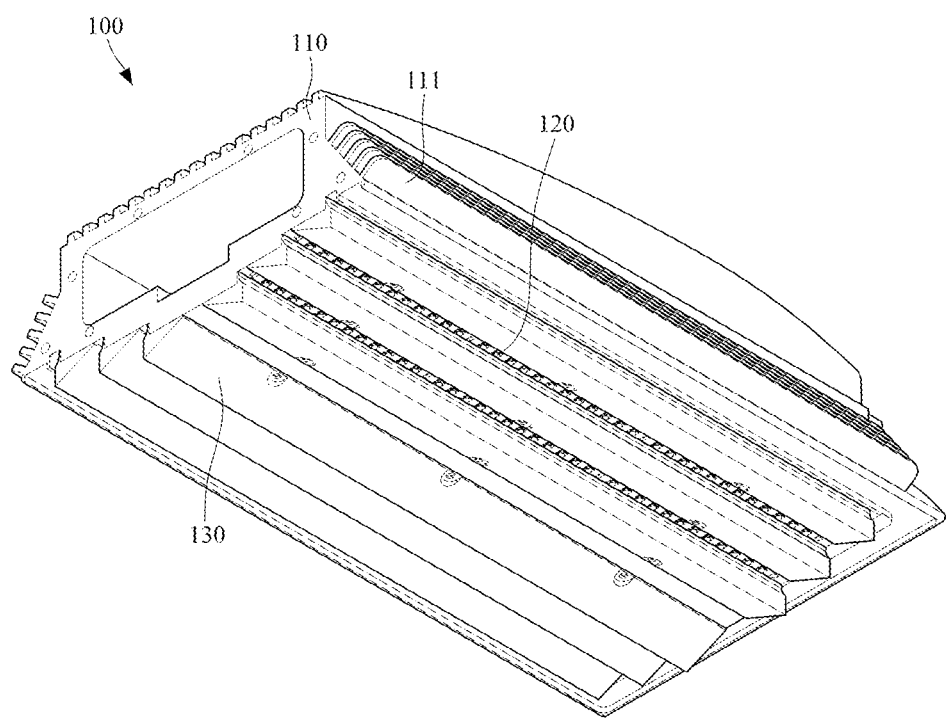
FIG. 1 is a schematic view illustrating an example of a lighting device for a street lamp according to an exemplary embodiment of the present invention.
Figure 2:
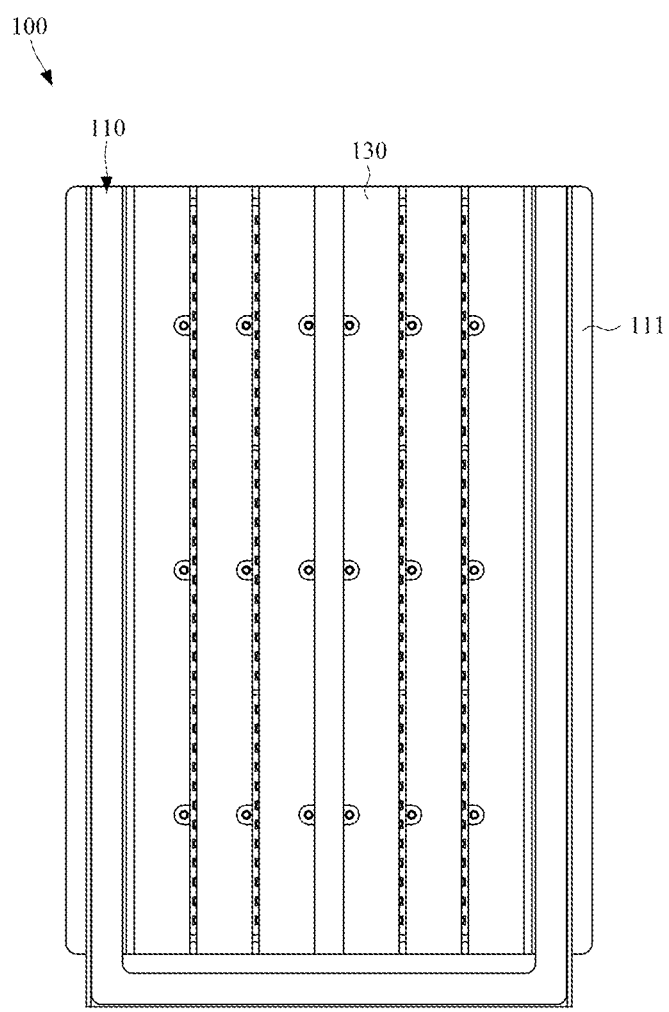
FIG. 2 is a bottom view illustrating a bottom side of the lighting device for a street lamp illustrated in FIG. 1.
Figure 3:
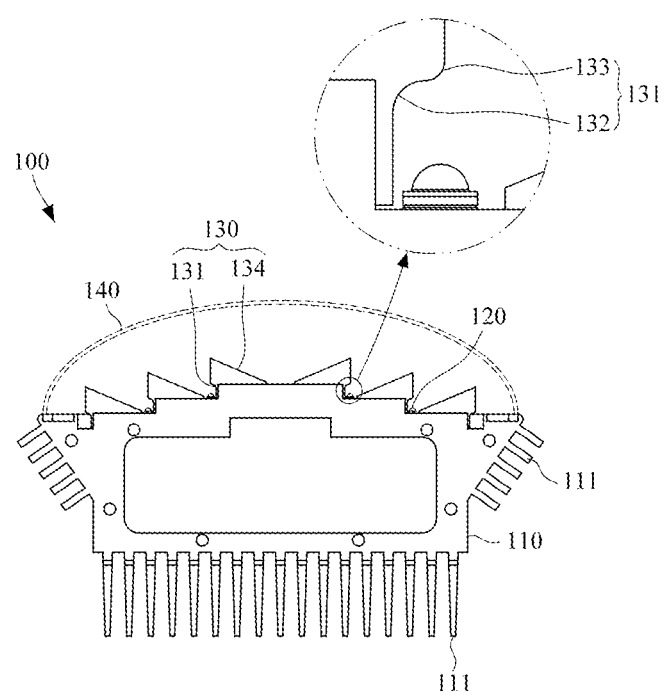
FIG. 3 is a vertical cross-sectional view of a lighting device for a street lamp illustrated in FIG. 1.
Figure 4:
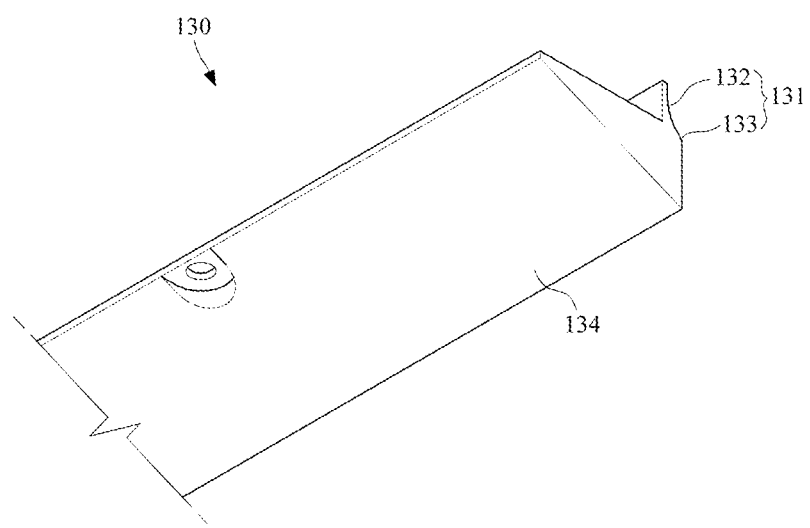
FIG. 4 is a schematic view illustrating a reflection unit of the lighting device for a street lamp illustrated in FIG. 1.

A lighting device for a street lamp according to the present invention includes: a base member that is formed at an upper side of a street lamp body arranged above a ground surface; a plurality of luminous element units, which are comprised of at least one luminous element, and are arranged on the bottom surface of the base member; and a plurality of reflection units, which are arranged to be adjacent to the luminous element units, and are arranged mutually isolated from each other by a predetermined distance on the bottom surface of the base member to diffuse light radiated from the luminous element units in multiple directions, in which the reflection unit includes: a first reflection section, which is arranged to be isolated from any one luminous element unit among the luminous element units by a predetermined distance, and formed to surround only one part of the luminous element unit such that at least one part of light radiated from the luminous element unit is reflected by the reflection units that are adjacently positioned in a first direction; and a second reflection section, which is formed to be slanted at a certain angle from the base member to diffuse light in multiple directions by being reflected by the reflection units, which are adjacently positioned in a second direction, opposite the first direction.

Modes of the Invention

The invention is described more fully hereinafter with reference to the accompanying drawings, in which exemplary embodiments of the invention are shown. First, when adding reference numerals to elements of the drawings, it should be noted that like reference numerals are used for like elements if possible although like elements are shown in different drawings. In addition, in the description of the present invention, if it is determined that a detailed description of commonly-used configurations or functions related to the invention may unnecessarily obscure the subject matter of the invention, the detailed description will be omitted. In the drawings, the shape and size of elements in the drawings may be exaggerated for clarity.

Referring to FIGS. 1 to 4, the lighting device for a street lamp 100 according to an exemplary embodiment of the present invention includes a base member 110, luminous element units 120, and reflection units 130.

The base member 110 is formed at an upper side of a street lamp body that is arranged above a ground surface. A bottom surface of the base member 110 is arranged to face a ground surface where cars pass. At one side of the base member 110 is formed a plurality of heat sinks 111. The heat sink 111 is configured to release heat, which is generated when a luminous element emits light, to the outside. The base member 110 may be formed of, for example, aluminum or copper. Aluminum and copper, which have excellent heat-release performance compared to other metals, may effectively release heat generated by a luminous element.

Meanwhile, the bottom surface of the base member 110 mentioned above may be a plane surface, but may also be a multi-step surface. In the case of a multi-step bottom surface, each one of the luminous element units 120 and the reflection units 130 may be arranged on each one step of the base member 110. Compared to the base member 110 with a plane bottom surface, this structure may be more advantageous in diffusing light in multiple directions by minimizing interference of light reflected between the reflection units 130, which is caused by an adjacent reflection unit 130.

The luminous element units 120 are configured to include at least one luminous element. The luminous element units 120 are arranged on the bottom surface of the base member, so that light generated from a luminous element radiates toward a ground surface. The luminous element unit 120 may be configured, for example, in such a manner that a plurality of luminous elements is arranged side by side. The number of luminous elements included in the luminous element units 120 may be changed according to design of manufacturers.

The reflection units 130 are arranged to be adjacent to the luminous element units 120. Further, the reflection units 130 are arranged to be mutually isolated from each other by a predetermined distance on the bottom surface of the base member. The reflection units 130 diffuse light radiated from the luminous element units 120 in multiple directions. To this end, the reflection units 130 include a first reflection section 131 and a second reflection section 134.

The first reflection section 131 is arranged to be isolated from any one luminous element unit 120 among the luminous element units 120 by a predetermined distance. Further, the first reflection unit 131 surrounds only one part of the luminous element unit 120 such that at least one part of light radiated from the luminous element unit 120 is reflected by the reflection units 130, which are adjacently positioned in a first direction.

The second reflection section 134 is slanted at a certain angle from the base member 110 to diffuse light in multiple directions by being reflected by the reflection units 130, which are adjacently positioned in a second direction, opposite to the first direction. Directions to radiate light on the street surface may be controlled diversely, depending on a slant angle of the second reflection section 134. For example, the second reflection unit 134 may be slanted at 45° from the base member 110, so as to focus light on a certain position of a ground surface, or the second reflection unit 134 may be slanted at 60° or above from the base member 110, so as to radiate light broadly on a ground surface. However, angles at which the second reflection section 134 is slanted from the base member 110 are not limited to the above-mentioned angles. A reflection layer may be formed on the surface of the first reflection section 131 and the second reflection section 134. The reflection layer may be, for example, a reflection sheet or an aluminum (Al) coated layer.

Figure 5:
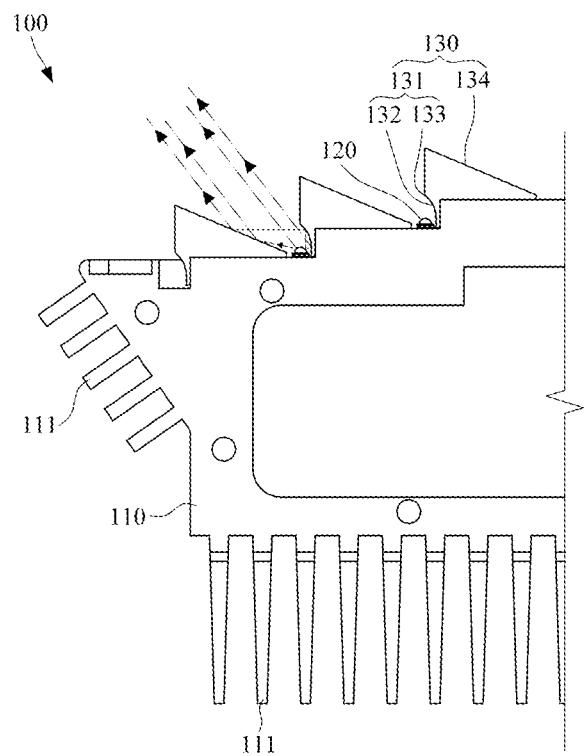
FIG. 5 is a cross-sectional view illustrating how light radiated from a luminous element unit is diffused by a reflection unit in the lighting device for a street lamp illustrated in FIG. 1.

As illustrated in FIG. 5, in the lighting device 100 for a street lamp having the above structure, some part of light radiated from the luminous element unit 120 is reflected by the first reflection section 131 and radiated toward a ground surface. Further, the rest part of light is reflected by the first reflection section 131, and reflected by the second reflection section 134 of an adjacent reflection unit 130, and radiated toward a ground surface.

That is, in the lighting device 100 for a street lamp having the above structure, the diffusion degree of light may be effectively improved by improving the directivity of a luminous element (LED), thereby sufficiently providing illumination for spaces between street lamps without individually installing a diffusion lens to the front surface of an LED, unlike a conventional lighting device for a street lamp using an LED as a light source. Therefore, by using a luminous device, which has excellent power efficiency compared to a mercury lamp or a sodium lamp, as a lighting device for a street lamp, power consumption and maintenance costs can be reduced, and uniform illumination on a street surface can be improved to prevent glare affecting drivers, thereby satisfying driving convenience, as well as preventing traffic accidents.

Meanwhile, an example of a detailed structure of the first reflection section 131 and the second reflection section 134 will be described in detail.

The first reflection section 131 may include a diffusion section 132 and an extension section 133.

The diffusion section 132 is formed in an arc shape so that a center part and a side part of the luminous element unit 120 correspond to each other. The diffusion section 132 diffuses light by reflecting light radiated from the luminous element unit 120.

The extension section 133 extends from one end of the diffusion section 132 by a predetermined length. The extension section 133 prevents some part of light radiated from the luminous element unit 120 from radiating toward a ground surface, so as to diffuse light in other directions. The extension section 133 may have a round part, which faces the luminous element unit 120.

Further, the second reflection section 134 may be formed into one body with the first reflection section 131, and may be a slanted surface, which is downwardly slanted at a certain angle toward a second direction. The second reflection section 134 again reflects light reflected from the first reflection section 131 of an adjacent reflection unit 130, so that light radiated from the luminous element unit 120 may be diffused.

Figure 6:
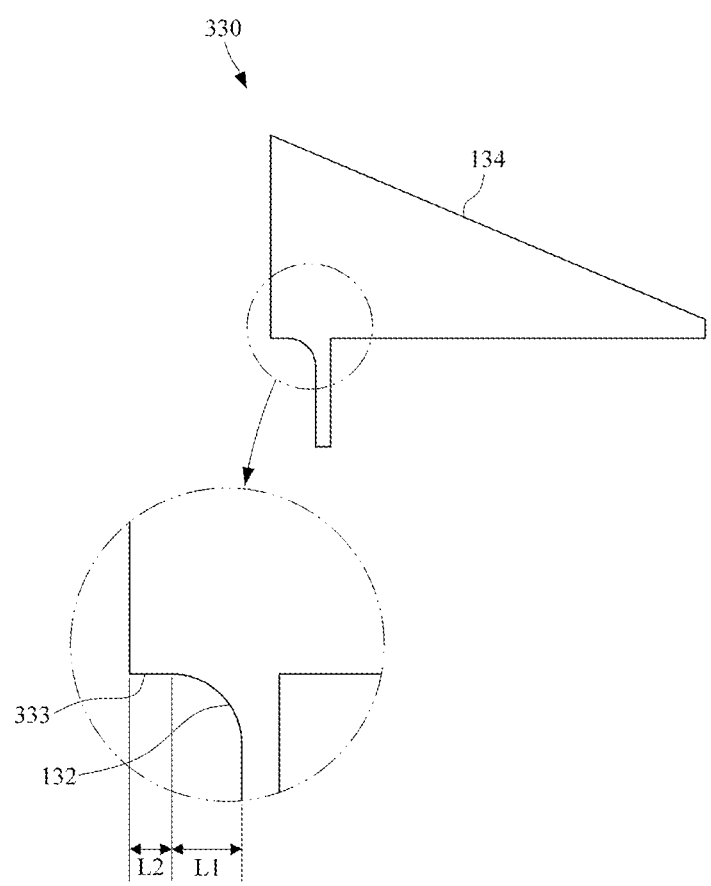
FIGS. 6 and 7 are schematic views illustrating modifications of a first reflection section in the lighting device for a street lamp illustrated in FIG. 1.

Meanwhile, referring to FIG. 6, as an example of modifications of the extension section 233 of the first reflection section, a part that faces the luminous element unit may have the same radius of curvature as the diffusion section 132.

Figure 7:
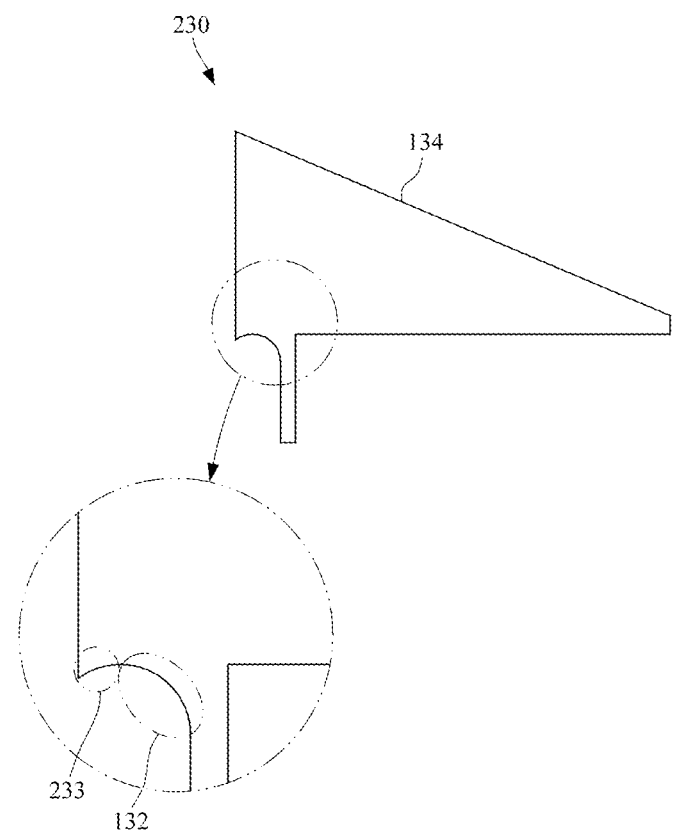

Further, referring to FIG. 7, as another example of modifications of the extension section 333 of the first reflection section, a part that faces the luminous element unit may be a plane surface.

Meanwhile, as illustrated in FIG. 7, a length (L2) of the extension section 333 may be about 50% of a radius (L1) of the diffusion section 132 having an arc shape. If the length (L2) of the extension section 333 exceeds 50% of the radius (L1) of the diffusion section 132, light radiated from the luminous element is excessively restricted, such that illumination may be reduced. By contrast, if the length (L2) of the extension section 333 is below 50% of the radius (L1) of the diffusion section 132, an amount of light, which is directly radiated on a ground surface in a vertical direction, becomes greater than an amount of light that is radiated from the luminous element and reflected by an adjacent reflection unit 130, such that a range of diffusion may be reduced.

Returning to FIG. 3, the lighting device 100 for a street lamp may further include a cover 140. The cover 140 prevents loss of an inner part of the lighting device 100 for a street lamp, which is caused by external moisture, or prevents accumulation of foreign substances, such as pollen or dust. The cover 140 may be formed in a dome shape with a plastic material having excellent light transmission. As other example of the cover 140, a diffusion lens may be used. The diffusion lens is used for diffusing light in such a manner that light radiated from the luminous element unit 120 and reflected by the reflection unit 130 is diffused again, thereby enabling light to be radiated from the lighting device 100 for a street lamp to a broader area of a ground surface.

While the invention has been shown and described with reference to certain exemplary embodiments thereof, it will be understood by those skilled in the art that various changes in form and details may be made therein without departing from the spirit and scope of the invention as defined by the appended claims.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The lighting device for a street lamp according to the present invention may be installed in a street lamp to be used for illumination in a sidewalk and a roadway.

The invention claimed is:

1. A lighting device for a street lamp comprising:
a base member that is formed at an upper side of a street lamp body arranged above a ground surface;
a plurality of luminous element units, which are comprised of at least one luminous element, and are arranged on the bottom surface of the base member; and
a plurality of reflection units, which are arranged to be adjacent to the luminous element units, and are arranged mutually isolated from each other by a predetermined distance on the bottom surface of the base member to diffuse light radiated from the luminous element units in multiple directions,
wherein the reflection unit comprises:
a first reflection section, which is arranged to be isolated from any one luminous element unit among the luminous element units by a predetermined distance, and formed to surround only one part of the luminous element unit such that at least one part of light radiated from the luminous element unit is reflected by the reflection units that are adjacently positioned in a first direction; and
a second reflection section, which is formed to be slanted at a certain angle from the base member to diffuse light in multiple directions by being reflected by the reflection units, which are adjacently positioned in a second direction, opposite the first direction,
wherein the first reflection section comprises:
a diffusion section, which is formed in an arc shape so that a center part and a side part of the luminous element unit correspond to each other; and
an extension section, which extends from one end of the diffusion section by a predetermined length; and
the second reflection section is formed into one body with the first reflection section, and is a slanted surface formed to be downwardly slanted at a certain angle toward the second direction.

2. The lighting device for a street lamp of claim 1, wherein the extension section has a part facing the luminous element unit, which is formed of a plane surface.

3. The lighting device for a street lamp of claim 1, wherein the extension section has a part facing the luminous element unit, which has the same radius of coverture as the diffusion section.

4. The lighting device for a street lamp of claim 1, wherein the extension section has a part facing the luminous element unit, which is round.

5. The lighting device for a street lamp of claim 1, wherein a bottom side of the base member is formed in multi steps, and each one of the luminous element units and the reflection units is arranged on each one step of the base member.

* * * * *